United States Patent [19]

Clement

[11] 4,447,852

[45] May 8, 1984

[54] CAPACITOR ASSEMBLY

[75] Inventor: Warren J. Clement, Williamstown, Mass.

[73] Assignee: Sprague Electric Company, North Adams, Mass.

[21] Appl. No.: 387,739

[22] Filed: Jun. 14, 1982

[51] Int. Cl.³ .............................................. H01G 1/14
[52] U.S. Cl. .................................................... 361/306
[58] Field of Search ......................... 361/303, 306, 433

[56] References Cited

U.S. PATENT DOCUMENTS

| 1,900,352 | 3/1933 | Lewis ............................. 361/306 X |
| 3,518,500 | 6/1970 | Jimerson et al. ..................... 361/433 |
| 3,553,544 | 1/1971 | Puppolo et al. ...................... 361/303 |
| 3,611,051 | 10/1971 | Puppolo et al. ..................... 361/433 |
| 3,654,524 | 7/1972 | Puppolo et al. ..................... 361/433 |
| 4,141,070 | 2/1979 | Bowling ............................. 361/433 |

Primary Examiner—Donald A. Griffin

[57] ABSTRACT

The foil extensions of each foil of an extended-foil capacitor section are joined together in terminal clamps that are secured in an insulating base of a capacitor case by terminal members that extend through the base.

14 Claims, 4 Drawing Figures

U.S. Patent May 8, 1984 4,447,852
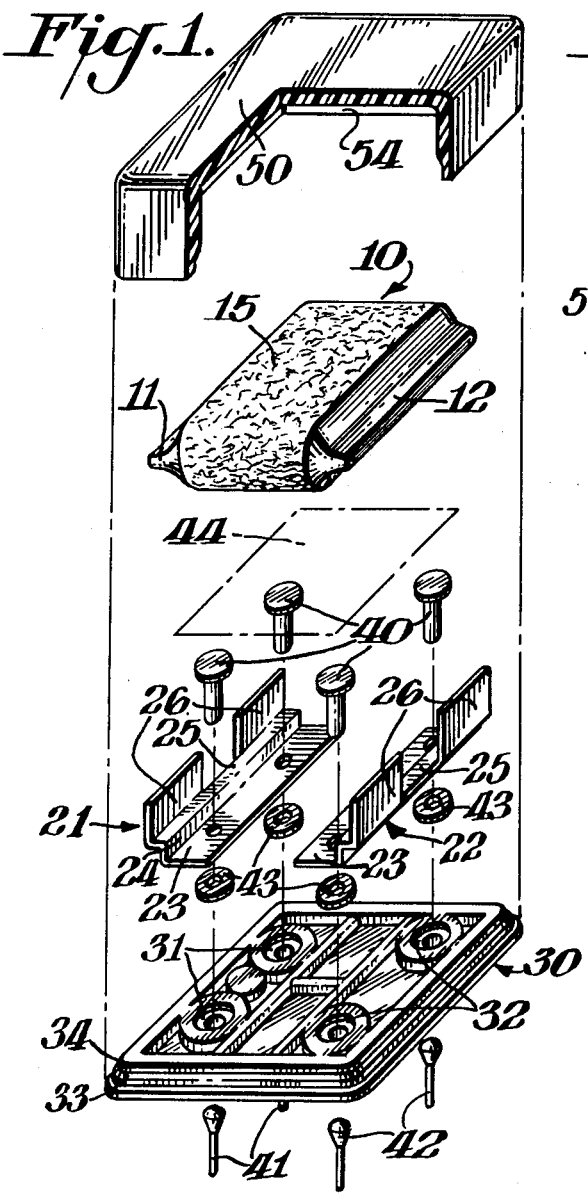
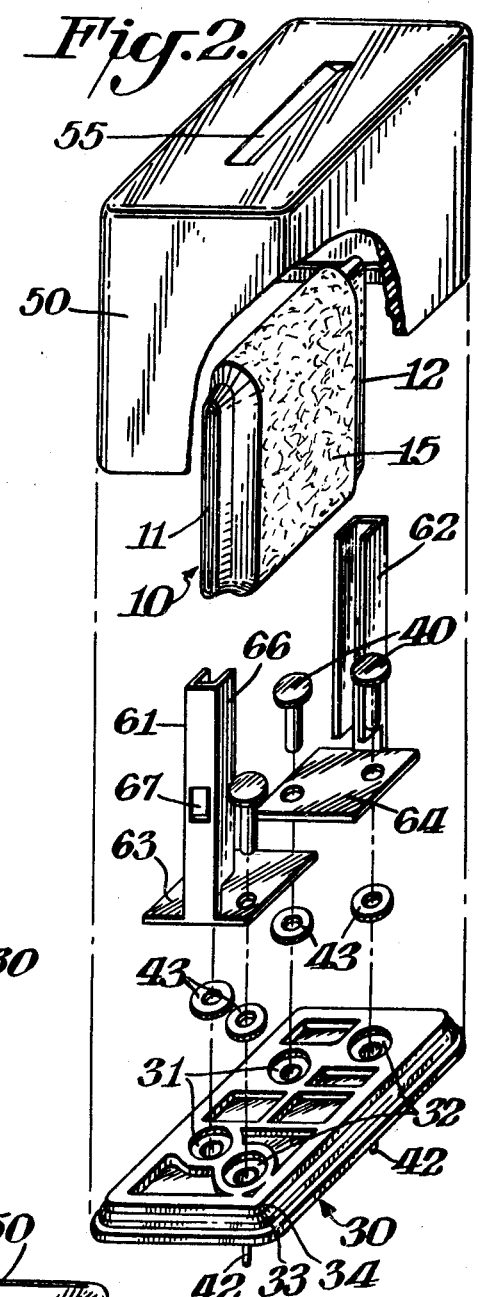
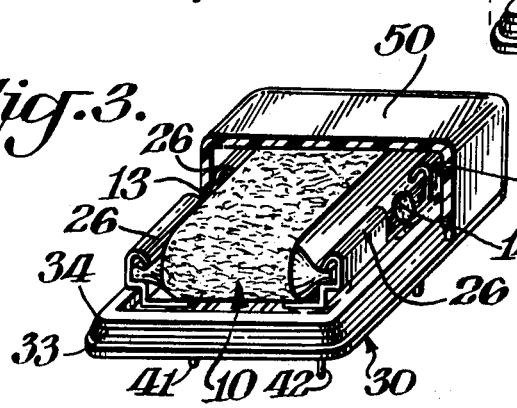
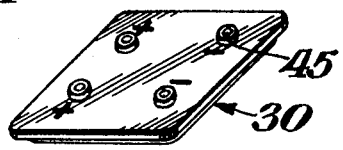

CAPACITOR ASSEMBLY

BACKGROUND OF THE INVENTION

This invention relates to a capacitor assembly in which a wound, extended-foil capacitor section is firmly held between and electrically connected to a pair of terminal clamps or bus strips. Preferably, the extended foils are edge-connected to provide a low-inductance unit. The terminal clamps or bus strips are attached to an insulating base by conducting members which extend through the base.

The capacitor of the present invention can be used wherever low-inductance units are required and particularly as a filter capacitor. Filter capacitors of various designs are well-known. They have been used to smooth rectified alternating current to give a minumum ripple output. They have also been used in switching power supplies to remove transient currents when the load changes.

The capacitor assembly of the present invention is particularly adaptable for use as a filter capacitor. By utilizing an edge-connected section together with the terminal clamps or bus strips of the present invention, the main current passes through these clamps with only ripple or transient currents passing through the capacitor section.

SUMMARY OF THE INVENTION

A capacitor assembly has a wound extended-foil capacitor section firmly held between and electrically connected to a pair of terminal clamps or bus strips. The terminal clamps or bus strips are one piece metal members which are attached to an insulating base by conducting members which extend through the base. External lead wires are attached to the extended ends of the conducting members, or the extended ends themselves are used as terminal pads to contact printed wiring boards. An insulating cover encases the unit and is sealed to the base.

Preferably, the edges of the one-piece terminal clamps or bus strips are crimped or rolled over the extended foil edges to hold the capacitor section in place. The capacitor section is preferably flattened, and the extended foil edges are crushed together and clamped tightly by the terminal or bus strips.

Even more specifically, the extended foil edges of the capacitor section are electrically connected to each other by welding. If an electrolytic capacitor section is used, then the section is impregnated by electolyte.

When the capacitor assembly is used as a filter capacitor, the terminal clamps or bus strips serve to carry the DC current while ripple or transient currents pass through the capacitor. Thus, a small capacitance section can be used since the full current does not pass through it. Since the edges of the extended foil are connected together, the worst case would have the full current passing through only a foil length equivalent to one edge of the section.

BRIEF DESCRIPTION OF THE DRAWING

FIG. 1 is an expanded view of one embodiment of the filter capacitor of the present invention.

FIG. 2 is an expanded view of a second embodiment of the present invention.

FIG. 3 is a partially cut away perspective of a finished capacitor of the embodiment of FIG. 1.

FIG. 4 is a perspective in reduced scale of the bottom of the capacitor base showing the ends of the conducting members.

DESCRIPTION OF THE PREFERRED EMBODIMENTS

A capacitor assembly particularly useful as a filter capacitor is shown in expanded form in FIG. 1. A capacitor section 10, preferably aluminum, is wound in extended-foil fashion with anode foil 11 extending at one end of the section and cathode foil 12 at the other end, and with interleaved and interwound spacer material 15 forming the outer layer. The wound section 10 is preferably flattened with edges of anode foil 11 pressed together and edges of cathode foil 12 similarly pressed together.

A pair of one-piece bus strips or terminal clamps 21 and 22 is fastened to insulating base 30 by conductive fastener means 40, preferably tubular rivets, which are extended through two pairs of holes 31 and 32 in base 30. Base 30 is molded with strengthening ribs and collars surrounding the holes 31 and 32 to receive gaskets 43. The spacing between the pair of holes 31 and the pair of holes 32 is different to provide different spacing for each pair of leads 41 and 42 which are welded to the bottoms of conductive means 40 on the underside of base 30 so as to prevent improper polarity use of the capacitor. Gaskets 43 fit between the heads of fasteners 40 and holes 31 and 32. Plastic sheet 44 ensures that any roughness on rivet 40 heads will not cut through spacer material 15 and short circuit section 10.

The rivets 40 are bonded to the base 30, preferably made of Ryton ®, a polyphenylene sulfide polymer, by the hot upsetting process described by Schroeder in U.S. Pat. No. 4,183,600 issued Jan. 15, 1980, thus fastening the unitary clamping strips 21 and 22 to the base 30 and sealing rivets 40 in the base.

In FIGS. 1 and 3, bus strips or terminal clamps 21 and 22 each have a bottom horizontal portion 23 with a pair of holes therein corresponding to the spacing of holes 31 and 32 of base 30. Extending vertically from the bottom portion 23 is a side portion in the form of a step with a vertical riser 24 and a lateral portion 25 from which a pair of spaced tabs 26, one at each end of each strip, extend upwardly.

As shown in FIG. 3, capacitor section 10 is placed between strips 21 and 22 with the extended-foil edges of section 10 lying on lateral portions 25 and abutting the tabs 26, which are then folded or rolled over and crimped or cold welded to the extended foil edges. Between the tabs 26, the extended foil edges are edge-connected as at 13 and 14, preferably welded, to lateral portion 25 of each strip, thus connecting the foil edges together to provide low inductance, and electrically connecting capacitor section 10 to the bus clamps 21 and 22. The section 10 is impregnated with electrolyte (not shown) and insulating cover 50, preferably also of Ryton ®, is sealed, preferably ultrasonic welding, to base 30, thereby enclosing and sealing the capacitor.

In order to facilitate assembly, base 30 is provided with a collar portion consisting of two steps 33 and 34, as shown in FIGS. 1 and 2. The upper step or portion 34 has a smaller perimeter than the lower step or portion 33 and is concentric with it. Portion 34 is designed to snap into groove 54 located on the inside bottom perimeter of cover 50. This groove 54 does not accommodate the bottom portion or step 33, but makes an interference fit with it as it forms the shear weld zone on ultrasonic welding.

Cover 50 may also have an internal pressure relief vent mechanism such as a molded elongated thinned portion, analogous to the slit vent taught by Moresi et al in U.S. Pat. No. 3,204,156 issued Aug. 31, 1965, preferably in its upper surface. The vent 55 is shown in FIG. 2 as being along the top of the cover, but is even more advantageously located internally in the top surface of cover 50.

Alternately, instead of or in addition to welds 13 and 14 for edge-connecting the section 10 directly to the terminal clamps or bus strips 21 and 22, the edge connected and tail-terminated section described by Puppolo in copending U.S. Pat. application Ser. No. 148,628 filed May 12, 1980 may be used. This Puppolo section consists of a wound and flattened extended-foil section in which the extended foils are edge-connected, preferably by welding, and the outside anode foil tail and outside cathode foil tail on opposite sides of the section are each terminated with an electrode tab. These electrode tabs would be connected to the respective bus strips or terminal clamps 21 and 22 of this invention, preferaby by welding. The extensions 26 of the clamps would be crimped or cold welded to the edge-connected foil extensions as described above to secure the capacitor in place.

Still another embodiment is shown in FIG. 2 for application where only one circuit board is to be used and available surface area on it is at a minimum. In this embodiment, the terminal clamps or bus strips 61 and 62 have horizontal base portions 63 and 64 with a pair of holes in each, but of different spacing corresponding to pairs of holes 31 and 32 in base 30. At one edge of base portions 63 and 64, side portions 66 extend vertically; the extensions 66 form a channel of spaced lateral walls with said base and are spaced from said base. There is a hole 67 provided in the spine of said channel so as to accommodate the welding of the edges of the extended foils of section 10 to each other and to terminal clamps or bus strips 61 and 62. If the edge-connected capacitor section of Puppolo described above is used, then the electrode tabs are electrically connected to the bus clamps 61 and 62 instead of welding the extended foil edges. In this case, opening 67 would not be needed. Extensions 66 are forced or crimped against the foil extensions 11 and 12 to hold the capacitor section 10 firmly in place. As described for the FIG. 1 embodiment, there is a subsequent ultrasonic welding of case cover 50 to base 30 so as to complete the capacitor.

FIG. 3 portrays the embodiment of FIG. 1 with cover 50 partially cut away after sealing to show the connection of the extended foils of section 10 to the bus clamps 21 and 22. Anode foil edges 11 are electrically connected to each other and to bus clamp 22 via weld 14. Tabs 26 are folded or rolled over, preferably crimped, so as to hold section 10 in place to reduce the strain on welds 13 and 14, and preferably, prior to making welds 13 and 14. Plastic strip 44 is optional and is used to prevent any burrs or roughness on rivet heads 40 from cutting through spacer material 15 and shorting out section 10. The section 10 is impregnated with electrolyte (not shown) and the cover 50 is attached to base 30 by ultrasonic welding. In addition to the differential spacing of pairs of leads 41 and 42, the external surface of base 30 may be made with markings indicating anode and cathode.

While it is preferred that external lead wires 41 and 42 are attached to the external surface of rivets 40, the capacitor can be used without them. As shown in FIG. 4, the external ends 45 of tubular rivets 40 are satisfactory for direct attachment, e.g. by soldering, to a circuit board without intervening leads.

The terminal clamps or bus strips used in the present invention firmly hold the capacitor section in place, which is particularly important when the capacitor case is sealed by ultrasonic welding. These clamps or bus strips provide a rugged construction that withstand vibration over prolonged use.

The capacitor of the present invention is specifically designed to replace a plurality of individual capacitors, each having to be individually inserted and wired, on circuit boards. The deliberately different spacing of the leads permits insertion in only one orientation. The embodiment shown in FIGS. 1 and 3 is for use when multiple boards are to be stacked with little space therebetween. The embodiment shown in FIG. 2 is for use when many components must fit on one board and available surface area thereon is at a minimum.

What is claimed is:

1. A capacitor assembly comprising a wound and flattened extended-foil capacitor section, a capacitor case having an insulating cover and an insulating base, a one-piece conductive bus having a horizontal bottom portion and a vertical side portion, conductive means passing through said bottom portion and said base securing said bus to said base, said side portion having spaced apart extensions clamped against foil edges extending from an end of said section and holding said section in place and electrically connecting said foil edges to said bus.

2. A capacitor according to claim 1 wherein said extended foil edge-connections to said bus are welded connections.

3. A capacitor according to claim 1 wherein said base has a raised collar portion inside of which said bus and said section are located.

4. A capacitor according to claim 3 wherein said collar portion has an upper portion and a lower portion, said upper portion having a smaller perimeter than said lower portion.

5. A capacitor according to claim 4 wherein said collar portion has an upper portion and a lower portion, said upper portion having a smaller perimeter than said lower portion.

6. A capacitor according to claim 5 wherein said cover is ultrasonically welded to said lower portion of said base.

7. A capacitor according to claim 5 wherein said cover portion of said case has a pressure relief vent structure in its upper surface.

8. A capacitor assembly according to claim 1 wherein said section is an extended-foil, wound and flattened aluminum electrolytic section impregnated with electrolyte.

9. A capacitor according to claim 1 wherein said section is an edge-connected, extended foil section in which each foil is terminated by an electrode tab and said section is electrically connected to said bus through said tab.

10. A capacitor section according to claim 1 wherein a second conductive bus having a bottom portion and a side portion is secured to said base, said second bus being clamped against foil edges extending from a second end of said section, said section being electrically connected to said second bus.

11. A capacitor according to claim 10 wherein each of said side portions of each of said buses extends vertically from said base and each of said extensions forms spaced lateral wall with said side portion to hold said extended foil edges and said section firmly in place.

12. A capacitor according to claim 11 wherein there is an opening in each of said side sections for said electrical connection of said extended foils to said buses.

13. A capacitor according to claim 10 wherein said side section of each of said buses has a vertical portion and a lateral portion forming a step, said vertical portion forming a riser between said bottom portion and said lateral portion, said lateral portion terminating in said spaced extensions, and said foil extensions being edge-connected between said extensions.

14. A capacitor according to claim 13 wherein said foil edge-connection is made to said lateral portion between said extensions.

* * * * *